United States Patent [19] [11] 4,295,208
Norbedo et al. [45] Oct. 13, 1981

[54] SIGNALLING SYSTEM INCLUDING APPARATUS FOR GENERATING AND TESTING DATA AND COMMAND WORDS WITHIN FIRST AND SECOND MESSAGE INTERVALS

[75] Inventors: Robert A. Norbedo, North Andover; Martin L. Resnick, Chestnut Hill, both of Mass.

[73] Assignee: GTE Laboratories Incorporated, Waltham, Mass.

[21] Appl. No.: 94,245

[22] Filed: Nov. 14, 1979

[51] Int. Cl.³ .................. G06F 3/04; G06F 11/30
[52] U.S. Cl. .................................................. 364/900
[58] Field of Search ... 364/200 MS File, 900 MS File; 371/12

[56] References Cited

U.S. PATENT DOCUMENTS

| | | | |
|---|---|---|---|
| 3,303,472 | 2/1967 | Chalker, Jr. et al. | 364/900 |
| 3,564,511 | 2/1971 | Restivo et al. | 364/900 |
| 3,688,274 | 8/1972 | Cormier et al. | 371/12 |
| 3,736,567 | 5/1973 | Lotan et al. | 364/200 |
| 3,795,800 | 5/1974 | Nimmo et al. | 371/12 |

*Primary Examiner*—Harvey E. Springborn
*Attorney, Agent, or Firm*—Peter Xiarhos

[57] ABSTRACT

Apparatus for a signalling system, includes a microprocessor operative to process data words and command words within first and second message intervals. During the first message interval, the microprocessor operates to generate and apply data words in succession to an output terminal and to receive and test command words received in succession at an input terminal. During the second message interval, the microprocessor operates to receive and test data words received in succession at the input terminal and to generate and apply command words in succession to the output terminal. Each command word includes flag data specifying the word as a command word and command data representing either a "send" command or a "retransmit" command. Each data word includes flag data specifying the word as a data word. The proper receipt and acceptance of a "send" command word in the first message interval results in a data word being applied to the output terminal, and the proper receipt and acceptance of a "retransmit" command word in the first message interval results in the previous data word being reapplied to the output terminal. The proper receipt and acceptance of a data word in the second message interval results in a "send" command word being applied to the output terminal; otherwise, a "retransmit" command word is applied to the output terminal.

17 Claims, 1 Drawing Figure

SIGNALLING SYSTEM INCLUDING APPARATUS FOR GENERATING AND TESTING DATA AND COMMAND WORDS WITHIN FIRST AND SECOND MESSAGE INTERVALS

CROSS-REFERENCE TO RELATED APPLICATIONS

The present application discloses subject matter which is disclosed, and claimed, in the following co-pending applications:

Ser. No. 965,808, filed Dec. 4, 1978, now U.S. Pat. No. 4,224,478, in the names of Robert J. Fahey and Martin L. Resnick, entitled "DATA TRANSMISSION CIRCUIT", and assigned to GTE Sylvania Incorporated and GTE Laboratories Incorporated;

Ser. No. 965,809, filed Dec. 4, 1978, now U.S. Pat. No. 4,220,825, in the name of Robert J. Fahey, entitled "TELEPHONE STATUS MONITOR CIRCUIT", and assigned to GTE Sylvania Incorporated;

Ser. No. 965,756, filed Dec. 4, 1978, now U.S. Pat. No. 4,224,602, in the names of Richard W. Anderson and Alfred I. Bottner, entitled "SIGNALLING DEVICE", and assigned to GTE Sylvania Incorporated;

Ser. No. 973,201, filed Dec. 26, 1978, now U.S. Pat. No. 4,220,872, in the name of Robert J. Fahey, entitled "D.C. POWER SUPPLY CIRCUIT", and assigned to GTE Sylvania Incorporated;

Ser. No. 973,218, filed Dec. 26, 1978, now U.S. Pat. No. 4,225,792, in the name of Robert J. Fahey, entitled "DETECTOR CIRCUIT", and assigned to GTE Sylvania Incorporated;

Ser. No. 75,782, filed Sept. 17, 1979, in the name of Richard L. Naugle, entitled "SENSING APPARATUS", and assigned to GTE Laboratories Incorporated;

Ser. No. 75,769, filed Sept. 17, 1979, in the names of Richard L. Naugle and William L. Geller, entitled "EXIT-ENTRY APPARATUS", and assigned to GTE Laboratories Incorporated;

Ser. No. 094,015, filed concurrently herewith, in the names of Jeffrey R. Fox, Arthur Margolies, Rob Moolenbeek and Martin L. Resnick, entitled "APPARATUS FOR MONITORING AND SIGNALLING SYSTEM", and assigned to GTE Laboratories Incorporated;

Ser. No. 094,018, filed concurrently herewith, in the names of Richard W. Anderson, J. Edward Schlener and Martin L. Resnick, entitled "APPARATUS FOR MONITORING AND SIGNALLING SYSTEM", and assigned to GTE Sylvania Incorporated and GTE Laboratories Incorporated;

Ser. No. 094,013, filed concurrently herewith, in the names of Richard W. Anderson and J. Edward Schlener, entitled "APPARATUS FOR MONITORING AND SIGNALLING SYSTEM", and assigned to GTE Sylvania Incorporated;

Ser. No. 094,012, filed concurrently herewith, in the names or Robert J. Fahey and Martin L. Resnick, entitled "TELEPHONE STATUS MONITOR APPARATUS", and assigned to GTE Sylvania Incorporated and GTE Laboratories Incorporated;

Ser. No. 094,014, filed concurrently herewith, in the names of Robert J. Fahey and Martin L. Resnick, entitled "APPARATUS FOR MONITORING USAGE OF A TELEPHONE", and assigned to GTE Sylvania Incorporated and GTE Laboratories Incorporated;

Ser. No. 094,242, filed concurrently herewith, in the names of Robert J. Fahey and Martin L. Resnick, entitled "APPARATUS FOR MONITORING AND SIGNALLING SYSTEM", and assigned to GTE Sylvania Incoporated and GTE Laboratories;

Ser. No. 094,241, filed concurrently herewith, in the name of Martin L. Resnick, entitled "DATA PROCESSING APPARATUS FOR RECEIVING AND PROCESSING CODED WORDS", and assigned to GTE Laboratories Incorporated;

Ser. No. 094,016, filed concurrently herewith, in the names of Richard W. Anderson, Robert J. Fahey, William R. McClellan, and J. Edward Schlener, entitled "MONITORING AND SIGNALLING SYSTEM", and assigned to GTE Sylvania Incorporated;

Ser. No. 094,017, filed concurrently herewith, in the names of Hans G. Blank and Martin L. Resnick, entitled "APPARATUS FOR COMMUNICATING WITH PROCESSING APPARATUS OVER A TELEPHONE NETWORK", and assigned to GTE Laboratories Incorporated;

Ser. No. 094,243, filed concurrently herewith, in the names of Robert J. Fahey and Robert A. Norbedo, entitled "APPARATUS FOR SIGNALLING SYSTEM", and assigned to GTE Sylvania Incorporated and GTE Laboratories Incorporated;

Ser. No. 094,019, filed concurrently herewith, in the names of Robert J. Fahey, Robert A. Norbedo and J. Edward Schlener, entitled "APPARATUS FOR MONITORING AND SIGNALLING SYSTEM", and assigned to GTE Sylvania Incorporated and GTE Laboratories Incorporated;

Ser. No. 094,244, filed concurrently herewith, in the names of Robert J. Fahey and Robert A. Norbedo, entitled "APPARATUS FOR SIGNALLING SYSTEM", and assigned to GTE Sylvania Incorporated and GTE Laboratories Incorporated; and Ser. No. 094,246, filed concurrently herewith, in the names of Robert J. Fahey, Robert A. Norbedo and Martin L. Resnick, entitled "VARIABLE TIMING SYSTEM", and assigned to GTE Sylvania Incorporated and GTE Laboratories Incorporated.

The following co-pending applications are directed to apparatus which may be employed in the signalling and monitoring system of the present invention:

Ser. No. 75,783, filed Sept. 17, 1979, in the names of Jeffrey R. Fox, Arthur Margolies, and Rob Moolenbeek, entitled "ELECTRICAL POWER SUPPLY APPARATUS", and assigned to GTE Laboratories Incorporated; and Ser. No. 084,976 filed Oct. 15, 1979, in the name of William L. Geller, entitled "DIGITAL COMMUNICATIONS RECEIVER", and assigned to GTE Laboratories Incorporated.

BACKGROUND OF THE INVENTION

The present invention relates to a monitoring and signalling system. More particularly, the present invention relates to a monitoring and signalling system such as a home health care system for monitoring the activities of individuals within their own homes, apartments, etc., and for providing bi-directional communication between these locations and a centralized communications center.

In recent years, as the general population has become older and the number of elderly persons in the population has increased, and also as a result of increased social welfare legislation directed to the needs of these persons, there has been an increased reliance and utilization of professional care institutions such as hospitals, nursing homes and retirement centers for providing health care and maintenance for these individuals. A large majority of these individuals are maintained and cared for in such institutions for good and proper reasons, most typically for the treatment of medical problems requiring medical facilities and equipment and the professional services of doctors, nurses and the like. However, there are a number of individuals who are presently maintained in institutions without medical reason. These individuals generally have no family or friends to care for them or who do not wish to impose upon or burden such family or friends and are prepared to sacrifice some measure of independence for the security and freedom from worry, anxiety, and loneliness that institutions can provide. It has therefore been recognized that if alternatives to institutionalization can be provided, especially for those individuals who do not require constant or continuing institutional attention or observation, while providing a substantial degree of security and independence for these individuals, preferably within their own homes, the burdens on the institutional care system can be reduced and result in lower health care costs. Any such alternatives which would also produce the same results for individuals other than the elderly, such as young handicapped, disabled or infirm adults, would also have the effect of improving the quality of life of such individuals and, at the same time, reducing health care costs.

A variety of apparatus and systems have been proposed heretofore directed to solutions to the problems as discussed hereinabove. One such system, developed in Sweden, is described in U.S. Pat. No. 3,885,235 and is adapted to monitor passively normal, routine activities of an individual in his or her own residence and to produce alarm conditions in the event these routine activities are not performed during some specified period of time, for example, a period of up to 24 hours. The system as described in the patent includes a plurality of actuating units which may be variously located in predetermined areas of the residence, such as halls, lavatories, bathrooms and bedrooms, and which may be associated with apparatus likely to be actuated or used routinely by the individual during the normal course of the day. This apparatus may include, by way of example, lighting circuits, radio sets, television sets and household appliances. Actuation or use of any one of the actuating units during the aforesaid specific time period will cause an electromechanical timer set to this time period to be reset and to repeat its timing cycle. In the event no actuating unit is actuated or used during the time period, for example, due to inactivity or incapacity of the individual, the timer times out after the time period and an alarm condition, for example, in the form of an audible or visual alarm, is produced by the system indicative of this situation. If the alarm condition was produced as the result of inactivity rather than incapacity, the user may disable the system by the use of a master switch. The master switch may also be used to disable the system when the individual leaves his or her residence for a prolonged period of time, for example, for a period of time greater than the time period of the timer. Upon return of the individual, the system is arranged so that routine operation of any one of the actuating units will have the effect of resetting the timer and causing the timer to repeat its timing cycle. The system as described above may also include an alarm switch in the residence for use by the individual in producing alarm conditions during emergencies, such as medical emergencies or accidents.

In a later version of the system as described in the aforementioned U.S. Pat. No. 3,885,235, known as the "Automatic Warning Aid (AWA)", additional features are provided, including a direction sensitive photocell optics arrangement in the bathroom; an electronic timer having two time periods, specifically, a short time period associated with the bathroom optics arrangement and a longer time period associated with all other actuating units; a pre-alarm cycle effective prior to an actual alarm cycle and during which an alarm condition can be cancelled or aborted; and remote alarm transmission. In this later system, recognition is given to the fact that the majority of accidents occur in the bathroom. Accordingly, the system is arranged so that when an individual enters the bathroom the direction sensitive photocell arrangement detects this entry and causes the timing cycle of the electronic timer to be reduced to its short time period, for example, about one hour. If the individual does not exit within the one hour period, for example, due to incapacity or inactivity of the individual, a pre-alarm cycle will be initiated and, if the pre-alarm cycle is not terminated or aborted by the individual, an actual alarm cycle will be initiated after passage of a short period of time (e.g., about ½ hour). In the event the individual exits from the bathroom within the one hour period, the direction sensitive photocell arrangement will detect this exit and cause the timing cycle of the electronic timer to be set or returned to its longer time cycle, for example, about 8 hours. During any pre-alarm cycle caused by non-use of any of the actuating units within the individual's residence the individual may, unless incapacitated, abort or cancel the pre-alarm cycle by actuation or use of any actuating unit (which resets the timer) so that no actual alarm condition will be produced. The alarm condition may be generated locally or, if desired, transmitted over a telephone network, for example, in the form of a recorded message, to a central alarm center from which communication with the individual may be attempted and/or help sent or summoned.

Another system which has been proposed heretofore for passively monitoring the activities of individuals within their own residences and for producing appropriate alarm conditions is described in U.S. Pat. No. 3,989,900. In this system, the use of a standard telephone is monitored. Each time the handset of the telephone is lifted off or removed from the cradle of the telephone, for example, during the making and receiving of routine telephone calls, a timer set to cycle through a predetermined time period, for example, up to 24 hours, is caused to be reset and to repeat its timing cycle. So long as the telephone is used during the time period of the timer no alarm condition will be produced. If no use of the telephone is made during the time period of the timer, for example, due to incapacity or inactivity of the individual, a local alarm condition is produced and, simultaneously therewith, a magnetic tape player is actuated to dial continuously a plurality of telephone numbers of locations at which help may be available and to transmit a prerecorded message that help is needed at the address of the individual. If the timing out of the timer was due to inactivity rather than incapacity, the user may, in response to the local alarm condition, abort the alarm condition and data transmission sequence (within a time period of about 90 seconds) by simply lifting and replacing the handset back on the cradle of the telephone thereby resetting the timer. This latter operation may also be used to reset the timer at such time as the individual plans to leave his residence for a period of time less than the predetermined time period of the timer. An activating switch is also provided in the system for activation of the alarm condition in the case of emergencies. The abovementioned patent also contemplates the use of a high speed digital dialer and transmitter in place of the aforementioned magnetic tape player. In this case, the timing out of the timer will produce a local alarm condition and, unless the alarm sequence is aborted (for example, within a 5 minute period), the digital dialer and transmitter will operate to seize a telephone line to establish communication with the central station. The dialing of the central station continues until a receiving signal has been received from the central station whereupon an identification signal can be sent to the central station.

In still other systems which have been proposed heretofore for enabling individuals to be maintained within their own residences while providing appropriate alarm signalling in emergency or accident situations, a transmitter is employed by an individual to communicate under a variety of conditions with control apparatus located on the premises. The transmitter, which may be in the form of a small, portable hand held unit or a unit carried in a pocket or purse or attached to clothing or worn as a pendant (e.g., see U.S. Pat. Nos. 4,121,160 and 4,134,108), may be used by the individual to communicate with the control apparatus in a variety of situations, including emergency or accident situations, to respond to periodic check signals or stimuli from the control apparatus as an indication that "all is well" (e.g., see U.S. Pat. No. 3,662,111), or to respond within predetermined time periods of timer apparatus. The signals from the transmitter are typically coded rf signals employed to control circuitry within the control apparatus. Activation of a transmitter in an emergency or accident situation, or failure to activate a transmitter at required times, for example, due to incapacity or inactivity, will ordinarily cause an alarm cycle to be initiated which, if not aborted or cancelled by the individual, will cause an alarm sequence to be initiated for informing others of the emergency, accident or inactivity situation. The alarm sequence may be variously initiated by digital or tape dialers and include one or more messages, identification data, etc., to be communicated, for example, over a telephone network, to such organizations or individuals as an emergency center, the police or fire department, ambulance service, doctors, paramedics, rescue teams, relatives, friends or neighbors. In many systems, repeated attempts will be made to communicate alarm information to a central location using one or more telephone numbers, and some systems may include handshaking operations between a local control unit and central equipment and include test calls for determining proper functioning of the systems.

While the various systems as described above are useful to a degree in alleviating the problems of individuals living alone, they all have serious shortcomings and disadvantages which limit their effectiveness and usefulness. As a group, for example, these systems utilize simple data handling, processing and communication techniques, being limited more or less to tape and digital dialing, the transmission and reception of limited amounts of data, and, in some cases, simple handshaking and parity-checking operations. It is not known, for example, that any of these systems employ computers, microprocessors, or the like capable of performing significant and substantial data processing, either within the residences of individuals or at central locations. As a result, these systems are susceptible to a high false alarm rate and reliability problems, these latter problems being especially exascerbated in those systems employing mechanical tape dialers and electromechanical timers and the like. In these systems, therefore, due to the lack of sophisticated data processing and communications, there is inadequate guarantee, if any, that a successful and satisfactory transmission of data, such as alarm conditions or information, has been achieved so that those persons charged with acting on this information can adequately discharge their duties. The systems as described above, perhaps also as a result of their limited data processing and communications capabilities, have limited capability in detecting or pinpointing, and distinguishing between, the malfunction of various critical components thereof, for example, actuating units, control apparatus or telephone lines. In these systems, the malfunction of a critical component thereof will, assuming that such malfunction is somehow communicated to a responsible person (e.g., as a result of an alarm condition), ordinarily require service personnel to enter a person's home and check out the entire system or a major part thereof to pinpoint the particular source of trouble or malfunction. Further, in those systems employing timers having one or more resettable time periods (e.e., a one-hour bathroom cycle and/or a regular 8-hour cycle), these time periods are alterable only within the residences of individuals, thereby requiring costly service calls by service personnel to effect the alterations. The alteration of timer periods only within the residences of individuals can also have the effect of increasing the chances of tampering by these individuals.

In addition to the abovementioned general shortcomings and disadvantages, the systems as described hereinabove have other and more specific shortcomings and disadvantages which limit their effectiveness and usefulness in a home health care environment. For example, in the Swedish systems the multiple actuating units and the alarm switches are hard-wired to the control units. This hard-wiring operation makes the installations of these systems complex, time-consuming and expensive. In addition, while using several diverse "passive" actuating units, the Swedish systems do not make use of a common passive actuating unit generally available and used frequently in most residences, namely, the telephone. While the systems described in U.S. Pat. No. 3,989,900 employ a telephone as a passive actuating unit, no other passive actuating units are employed, thereby reducing the scope of monitoring of the activities of individuals. In addition, only on/hook to off-/hook transistions of the telephone are used to reset the timer in the control unit. Thus, at the conclusion of a telephone conversation the off/hook to on/hook transition resulting from the individual replacing the handset on the cradle of the telephone will not reset the timer, thereby having the probable effect of increasing the alarm rate of the system. In the case of the systems employing rf transmitters for transmitting alarm conditions or responding to predetermined check signals, these systems similarly do not employ passive actuating units and thereby have a reduced scope of monitoring of the activities of individuals and, therefore, a reduced effectiveness.

BRIEF SUMMARY OF THE INVENTION

In accordance with the present invention, apparatus is provided for a signalling system such as a home health care system as described hereinabove. The apparatus in accordance with the present invention includes a first apparatus arranged during a first message interval to generate and apply data words in succession to an output terminal and to receive and test command words received in succession at an input terminal. Each of the command words includes flag data specifying the word as a command word, command data representing either a "send" command or a "retransmit" command, and other data.

The first apparatus generally includes a first test arrangement and a send/retransmit arrangement. The first test arrangement operates to receive each command word at the input terminal and to test the command word to determine whether the word satisfies prescribed requirements of command words including whether the flag data specifies the word as a command word and the command data represents a "send" command or a "retransmit" command. The send/retransmit arrangement operates if a command word tested by the first test arrangement satisfies the prescribed requirements of a command word and represents a "send" command to generate and apply a data word to the output terminal. The send/retransmit arrangement further operates if a command word tested by the first test arrangement satisfies the prescribed requirements of a command word and represents a "retransmit" command to reapply the data word last applied to the output terminal back to the output terminal.

The apparatus in accordance with the invention further includes a second apparatus arranged during a second message interval to receive and test data words in succession at the input terminal and to generate and apply command words in succession to the output terminal. Each of the data words includes flag data specifying the word as a data word and other data. Each of the command words includes command data representing either a "send" command or a "retransmit" command.

The second apparatus generally includes a second test arrangement and a third arrangement. The second test arrangement operates to receive each data word at the input terminal during the second message interval and to test the data word to determine whether the data word satisfies prescribed requirements of a data word including whether the flag data specifies the word as a data word. The third arrangement operates if a data word tested by the second test arrangement satisfies the prescribed requirements of a data word to generate and apply a command word including command data representing a "send" command to the output terminal for requesting the next word. The third arrangement further operates if a data word tested by the second test arrangement does not satisfy the prescribed requirements of a data word to generate and apply a command word including command data representing a "retransmit" command to the output terminal for requesting the previous word.

BRIEF DESCRIPTION OF THE DRAWING

Various objects, features and advantages of a monitoring and signalling system in accordance with the present invention will be had from a detailed discussion taken in conjunction with the accompanying drawing in which.

DETAILED DESCRIPTION OF THE INVENTION

Figure 1:
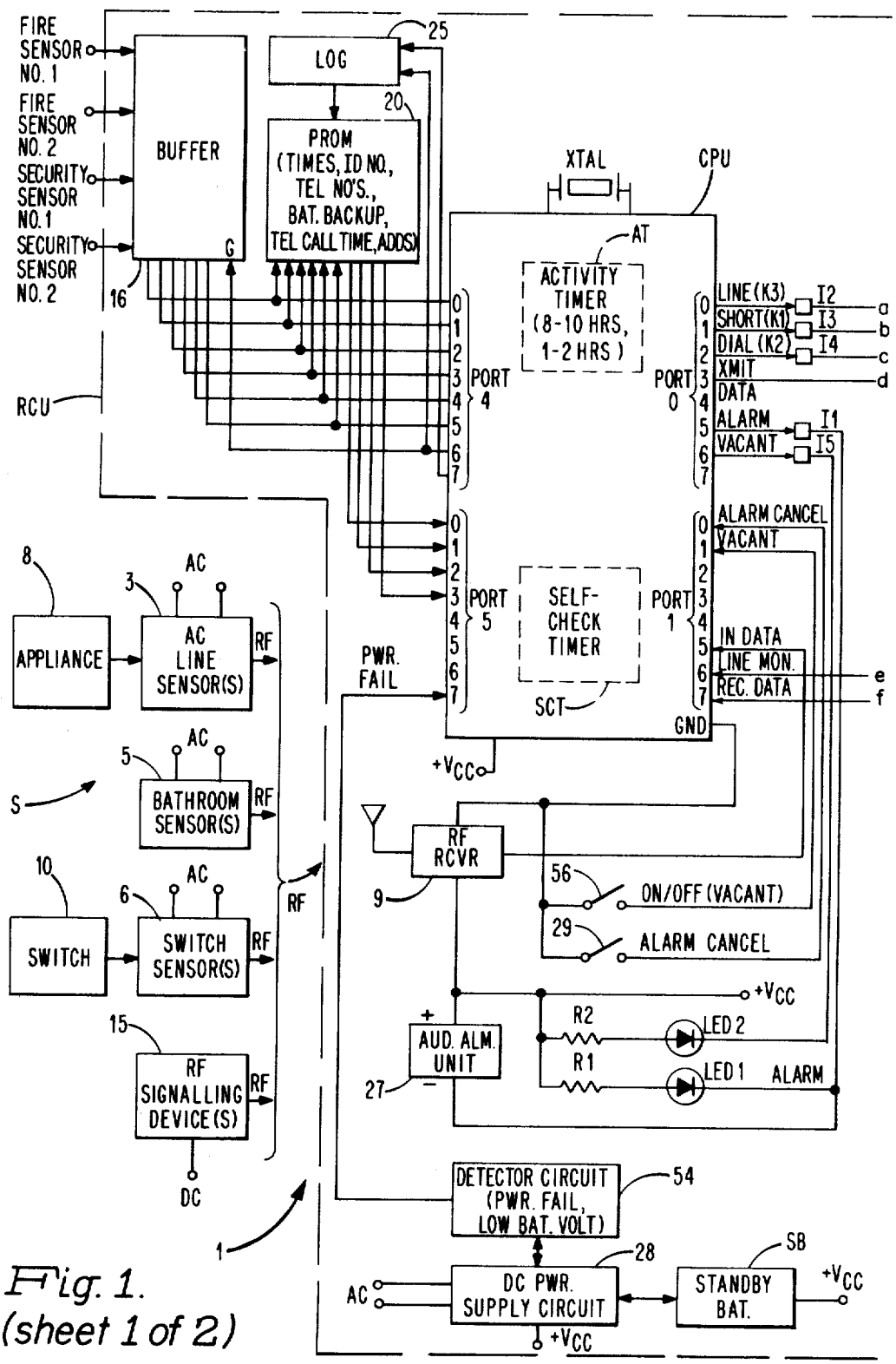
FIG. 1 is a schematic block diagram of a monitoring and signalling system in accordance with the present invention.
Figure 1:
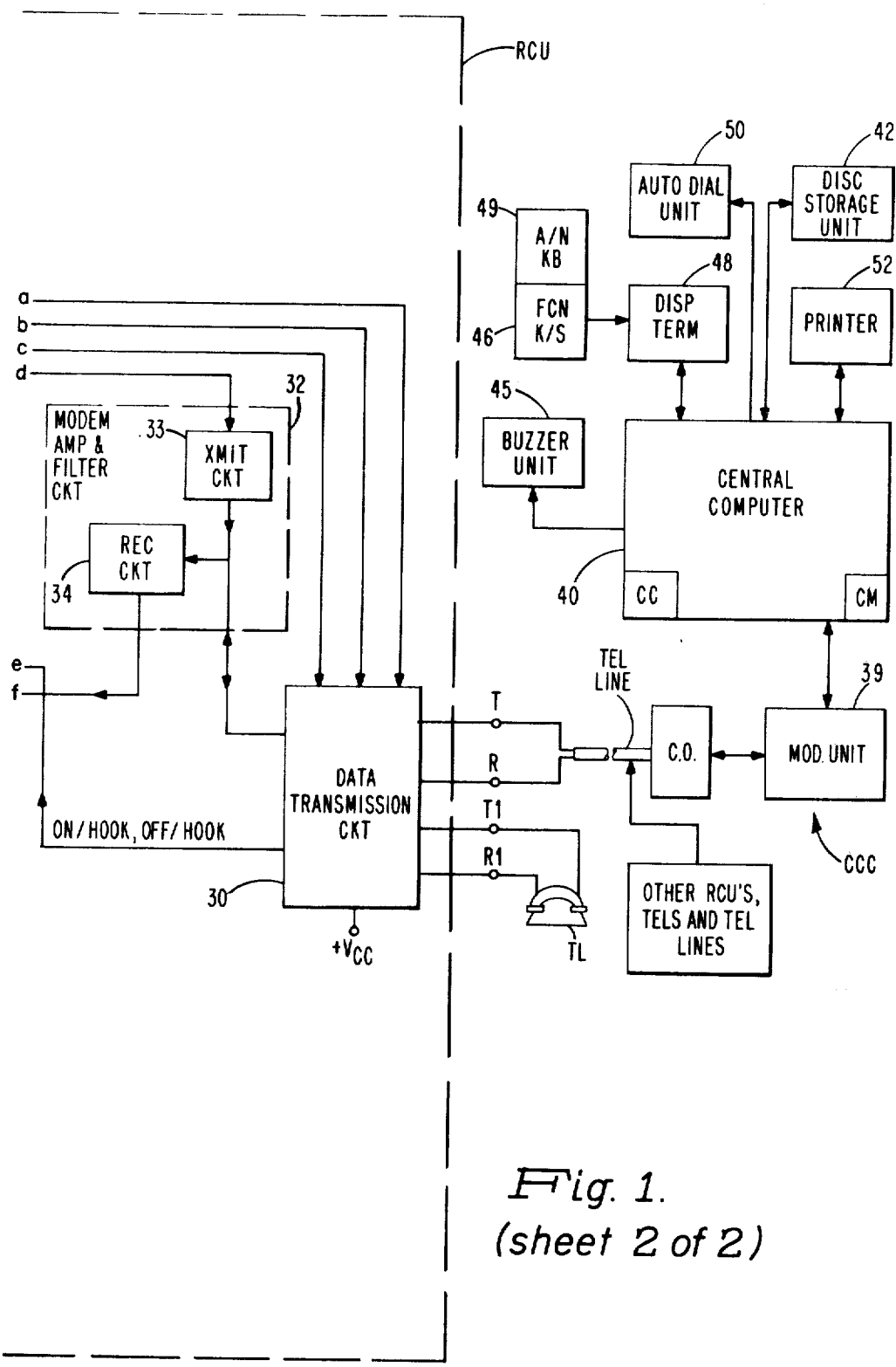

The present invention is described in detail in copending patent application Ser. No. 094,017, filed Nov. 14, 1979 in the names of Hans G. Blank and Martin L. Resnick. The following portions of that copending application are incorporated herein by reference:

(a) FIGS. 2-66 and the corresponding brief description thereof under the heading "BRIEF DESCRIPTION OF THE DRAWING"; and (b) The entire portion of the specification following the heading "DETAILED DESCRIPTION OF THE INVENTION".

What is claimed is:

1. In a signalling system, apparatus comprising:
   an input terminal;
   an output terminal;
   first means arranged during a first message interval to generate and apply data words in succession to the output terminal and to receive and test command words received in succession at the input terminal, each of said command words including flag data specifying the word as a command word, command data representing either a "send" command or a "retransmit" command, and other data, said first means comprising:
   first test means operative to receive each command word at the input terminal and to test the command word to determine whether the word satisfies prescribed requirements of command words including whether the flag data specifies the word as a command word and the command data represents a "send" command or a "retransmit" command; and
   send/retransmit means operative if a command word tested by the first test means satisfies the prescribed requirements of a command word and represents a "send" command to generate and apply a data word to the output terminal, and operative if a command word tested by the first test means satisfies the prescribed requirements of a command word and represents a "retransmit" command to reapply the data word last applied to the output terminal back to the output terminal; and
   second means arranged during a second message interval to receive and test data words received in succession at the input terminal and to generate and apply command words in succession to the output terminal, each of said data words including flag data specifying the word as a data word and other data, and each of the command words including command data representing either a "send" command or a "retransmit" command, said second means comprising:
   second test means operative to receive each data word at the input terminal and to test the data word to determine whether the data word satisfies prescribed requirements of a data word including whether the flag data specifies the word as a data word; and
   third means operative if a data word tested by the second test means satisfies the prescribed requirements of a data word to generate and apply a command word including command data representing a "send" command to the output terminal for requesting the next word, and operative if a data word tested by the second test means does not satisfy the prescribed requirements of a data word to generate and apply a command word including command data representing a "retransmit" command to the output terminal for requesting the previous word.

2. Apparatus in accordance with claim 1 further comprising:

transmit/receive storage means arranged to store data for incorporation into data words to be applied to the output terminal and to receive and store data from the data words received at the input terminal;

and wherein:

the send/retransmit means includes means operative if a command word tested by the first test means satisfies the prescribed requirements of a command word and represents a "send" command to extract data from the transmit/receive storage means and to form a data word therefrom for application to the output terminal; and the second means further comprises means operative if a data word tested by the second test means satisfies the prescribed requirements of a data word to extract data therefrom and to apply the extracted data to the transmit/receive storage means to be then stored therein.

3. Apparatus in accordance with claim 1 further comprising:

error recording means for recording the occurrence of error conditions;

means operative if a command word tested by the first test means does not satisfy the prescribed requirements of a command word, or it does not represent a "send" command or a "retransmit" command, to cause the error recording means to record the occurrence of an error condition;

means operative if a data word tested by the second test means does not satisfy the prescribed requirements of a data word to cause the error recording means to record the occurrence of an error condition; and means operative if the occurrence of a predetermined number of error conditions are recorded by the error recording means to cause the application of further words to the output terminal to be discontinued.

4. Apparatus in accordance with claim 3 further comprising:

means operative if a command word tested by the first test means satisfies the requirements of a command word and represents a "send" command to place the error recording means in a reset state in preparation for recording the occurrence of subsequent error conditions; and means operative if a data word tested by the second test means satisfies the prescribed requirements of a data word to place the error recording means in its reset state in preparation for recording the occurrence of subsequent error conditions.

5. Apparatus in accordance with claim 1 wherein:

each of the first and second means may further receive and test a "call back" command word at the input terminal, said "call back" command word including flag data specifying the word as a command word, command data representing the "call back" command, and other data;

each of the first and second test means is further operative to test a "call back" command word received at the input terminal to determine whether it satisfies prescribed requirements of a "call back" command word including whether the flag data specifies the word as a command word and the command data represents a "call back" command; and each of the send/retransmit means and the third means is further operative if the command word tested by the respective first or second test means satisfies the requirements of a command word and represents a "call back" command to discontinue the application of words to the output terminal.

6. Apparatus in accordance with claim 1 wherein:

each command word received at the input terminal includes a data/command flag bit of a first logic value specifying the word as a command word;

the first test means operates to test the command word to determine if the data/command bit has the first logic value;

each data word received at the input terminal includes a data/command flag bit of a second logic value specifying the word as a data word; and the second test means operates to test the data word to determine if the data/command flag bit has the second logic value.

7. Apparatus in accordance with claim 1 wherein:

the first means is operative at the commencement of the first message interval to generate and apply a data word to the output terminal representing the first word of the first message interval; and the second means is operative at the commencement of the second message interval to generate and apply a command word including command data representing a "send" command word to the output terminal representing the first word of the second message interval.

8. Apparatus in accordance with claim 1 wherein:

the second means is arranged to receive a prescribed number of data words at the input terminal during the second message interval, and further arranged to receive a "hang-up" command word at the input terminal, said "hang-up" command word including flag data specifying the word as a command word, command data representing a "hang-up" command, and other data;

said second means further comprising:

third test means operative following the testing by the second test means of the last word of the aforesaid prescribed number of data words to test the next word received at the input terminal to determine whether the word satisfies prescribed requirements of a "hang-up" command word including whether the flag data specifies the word as a command word and the command data represents a "hang-up" command; and means operative if the word tested by the third test means satisfies the prescribed requirements of a "hang-up" command word to cause the application of command words to the output terminal to be discontinued.

9. In a signalling system, apparatus comprising:
an input terminal;
an output terminal;

first means arranged during a first message interval to generate and apply data words in succession to the output terminal and to receive and test command words received in succession at the input terminal, each of said command words including a start bit of a specific logic value, a plurality of command bits of prescribed logic values representing either a "send" command or a "retransmit" command, a flag bit of a first logic value specifying the word as a command word, a stop bit of a specific logic value, and a parity bit of a first or second logic value related to the values of the other bits for achieving a particular system of parity for the command word, said first means comprising:

first test means operative to receive each command word at the input terminal and to test the command word to determine whether the word satisfies prescribed requirements of command words including whether the start bit has the specific logic value, the command bits represent either a "send" command or a "retransmit" command, the flag bit has the first logic value specifying the word as a command word, the stop bit has the specific logic value, and the parity bit has the specific first or second logic value; and send/retransmit means operative if a command word tested by the first test means satisfies the prescribed requirements of a command word and represents a "send" command to generate and apply a data word to the output terminal, and operative if a command word tested by the first test means satisfies the prescribed requirements of a command word and represents a "retransmit" command to reapply the data word last applied to the output terminal back to the output terminal; and second means arranged during a second message interval to receive and test data words received in succession at the input terminal and to generate and apply command words in succession to the output terminal, each of said data words including a start bit of a specific logic value, a combination of bits of first and/or second logic values, a flag bit of the second logic value specifying the word as a data word, a stop bit of a specific logic value, and a parity bit of a first or second logic value related to the logic values of the other bits for achieving a particular system of parity for the data word, said second means comprising:

second test means operative to receive each data word at the input terminal and to test the data word to determine whether the data word satisfies prescribed requirements of a data word including whether the flag bit has the second logic value specifying the word as a data word and the stop bit has the specific value, said second test means being further operative to calculate a value of parity corresponding to the bits other than the parity bit and to determine whether the calculated value of parity is the same as the logic value of the parity bit; and third means operative if a data word tested by the second test means satisfies the prescribed requirements of a data word to generate and apply a command word including command data representing a "send" command to the output terminal for requesting the next word, and operative if a data word tested by the second test means does not satisfy the prescribed requirements of a data word to generate and apply a command word including command data representing a "retransmit" command to the output terminal for requesting the previous word.

10. Apparatus in accordance with claim 9 further comprising:

transmit/receive storage means arranged to store data for incorporation into data words to be applied to the output terminal and to receive and store data from the data words received at the input terminal;

and wherein:

the send/retransmit means includes means operative if a command word tested by the first test means satisfies the prescribed requirements of a command word and represents a "send" command to extract data from the transmit/receive storage means and to form a data word therefrom for application to the output terminal; and the second means further comprises means operative if a data word tested by the second test means satisfies the prescribed requirements of a data word to extract data therefrom and to apply the extracted data to the transmit/receive storage means to be then stored therein.

11. Apparatus in accordance with claim 9 further comprising:

error recording means for recording the occurrence of error conditions;

means operative if a command word tested by the first test means does not have a start bit of the required logic value, or the plurality of command bits do not represent a "send" command or a "retransmit" command, or the flag bit does not have the first logic value or the stop bit does not have the required logic value, or the parity bit does not have the required logic value, to cause the error recording means to record the occurrence of an error condition;

means operative if a data word tested by the second test means does not have a flag bit of the second logic value, or the stop bit does not have the required logic value, or the calculated value of parity is not the same as the logic value of the parity bit, to cause the error recording means to record the occurrence of an error condition; and means operative if the occurrence of a predetermined number of error conditions are recorded by the error recording means to cause the application of further words to the output terminal to be discontinued.

12. Apparatus in accordance with claim 11 further comprising:

means operative if a command word tested by the first test means has a start bit of the required logic value, the plurality of command bits represent a "send" command, the flag bit has the first logic value, the stop bit has the required logic value, and the parity bit has the required logic value to place the error recording means in a reset state in preparation for recording the occurrence of subsequent error conditions; and means operative if a data word tested by the second test means has a flag bit of the second logic value, the stop bit has the required logic value and the calculated value of parity is the same as the logic value of the parity bit to place the error recording means in its reset state in preparation for recording the occurrence of subsequent error conditions.

13. Apparatus in accordance with claim 9 wherein:

the second means is arranged to receive a prescribed number of data words at the input terminal during the second message interval, and further arranged to receive an additional command word at the input terminal, said additional command word including a start bit of a specific logic value, a plurality of command bits of prescribed logic values representing a "hang-up" command, a flag bit of the first logic value specifying the word as a command word, a stop bit of a specific logic value, and a parity bit of a first or second value related to the values of the other bits for achieving the particular system of parity for the command word;

said second means further comprising:

third test means operative following the testing by the second test means of the last word of the aforesaid prescribed number of data words to test the next word received at the input terminal to determine whether the word satisfies prescribed requirements of a "hang-up" command word including whether the start bit has the specific logic value, the command bits represent a "hang-up" command, the flag bit has the first logic value specifying the word as a command word, the stop bit has the specific logic value, and the parity bit has the specific first or second logic value; and means operative if the word tested by the third test means satisfies the prescribed requirements of a "hang-up" command to cause the application of command words to the output terminal to be discontinued.

14. Apparatus in accordance with claim 13 further comprising:

error recording means for recording the occurrence of error conditions;

means operative if a command word tested by the first test means does not have a start bit of the required logic value, or the plurality of command bits do not represent a "send" command or a "retransmit" command, or the flag bit does not have the first logic value, or the stop bit does not have the required logic value, or the parity bit does not have the required logic value, to cause the error recording means to record the occurrence of an error condition;

means operative if a data word tested by the second test means does not have a flag bit of the second logic value, or the stop bit does not have the required logic value, or the calculated value of parity is not the same as the logic value of the parity bit, to cause the error recording means to record the occurrence of an error condition; and means operative if a word tested by the third test means does not have a start bit of the required logic value, or the command bits do not represent a "hang-up" command, or the flag bit does not have the first logic value specifying the word as a command word, or the stop bit does not have the required value, or the parity bit does not have the required logic value, to cause the error recording means to record the occurrence of an error condition;

means operative if the occurrence of a predetermined number of error conditions are recorded by the error recording means to cause the application of further words to the output terminal to be discontinued;

means operative if a command word tested by the first test means has a start bit of the required logic value, the plurality of command bits represent a "send" command, the flag bit has the first logic value, the stop bit has the required logic value, and the parity bit has the required logic value, to place the error recording means in a reset state in preparation for recording the occurrence of subsequent error conditions; and means operative if a data word tested by the second test means has a flag bit of the second logic value, the stop bit has the required logic value and the calculated value of parity is the same as the logic value of the parity bit to place the error recording means in its reset state in preparation for recording the occurrence of subsequent error conditions.

15. Apparatus in accordance with claim 9 wherein:

each of the first and second means may further receive and test a "call back" command word at the input terminal, said "call back" command word including a start bit of a specific logic value, a plurality of command bits of prescribed logic values representing the "call back" command, a flag bit of the first logic value specifying the word as a command word, a stop bit of a specific logic value, and a parity bit of the first or second logic value related to the values of the other bits for achieving a particular system of parity for the command word;

each of the first and second test means is further operative to test a "call back" command word received at the input terminal to determine whether the word satisfies the prescribed requirements of a "call back" command word including whether the start bit has the specific logic value, the command bits represent a "call back" command, the flag bit has the first logic value specifying the word as a command word, the stop bit has the specific logic value, and the parity bit has the specific first or second logic value; and each of the send/retransmit means and the third means is further operative if the command word tested by the respective first or second test means satisfies the requirements of a command word and represents a "call back" command to discontinue the application of words to the output terminal.

16. Apparatus in accordance with claim 14 wherein:

the first means is operative at the commencement of the first message interval to generate and apply a data word to the output terminal representing the first word of the first message interval; and the second means is operative at the commencement of the second message interval to generate and apply a command word including command data representing a "send" command word to the output terminal representing the first word of the second message interval.

17. Apparatus in accordance with claim 16 further comprising:

transmit/receive storage means arranged to store data for incorporation into data words to be applied to the output terminal and to receive and store data from data words received at the input terminal;

and wherein:

the send/retransmit means includes means operative if a command word tested by the first test means satisfies the prescribed requirements of a command word and represents a "send" command to extract data from the transmit/receive storage means and to form a data word therefrom for application to the output terminal; and the second means further comprises means operative if a data word tested by the second test means satisfies the prescribed requirements of a data word to extract data therefrom and to apply the extracted data to the transmit/receive storage means to be then stored therein.

* * * * *